Oct. 10, 1967 E. K. HOWELL 3,346,744

POWER CONTROL CIRCUITS

Original Filed Feb. 7, 1964 2 Sheets-Sheet 1

INVENTOR.
E. KEITH HOWELL
BY Melvin M. Goldenberg
ATTORNEY

INVENTOR.
E. KEITH HOWELL
BY Melvin M. Goldenberg
ATTORNEY

United States Patent Office 3,346,744

Patented Oct. 10, 1967

3,346,744

POWER CONTROL CIRCUITS

Edward Keith Howell, Skaneateles, N.Y., assignor to General Electric Company, a corporation of New York Continuation of application Ser. No. 343,302, Feb. 7, 1964. This application Mar. 8, 1967, Ser. No. 621,710

15 Claims. (Cl. 307—88.5)

ABSTRACT OF THE DISCLOSURE

A circuit for controlling the energization of a load by determining the conduction of a unitary bi-directional semiconductor device in circuit with a source and the load. A single control electrode of the semiconductor device is used in conjunction with a control signal source, which source is switched or otherwise caused to be in circuit with the control electrode to change the conductivity state of the semiconductor device. The control signal source is shown as either directional or alternating.

This application is a continuation of Ser. No. 343,302 filed Feb. 7, 1964, and now abandoned.

This invention relates to circuitry for controlling the supply of power to a load. More particularly, the invention relates to such circuits employing bi-directional current conducting semiconductor devices.

The continuous growth of the application of electrically operated equipment in a vast number of fields has focused attention upon the means used for supplying the power to such equipment. It is fully appreciated that not only the generation of electrical power but also its delivery to the equipment in usable form is important. Accordingly, considerable design effort has been concentrated on circuitry for suitably supplying power to a wide variety of load circuits. Among the great number of important characteristics that must be weighed in the selection of any particular power control circuit must be included the cost factor. This in turn may be broken down into the initial cost of construction, the operating costs, and the maintenance costs. Further characteristics include the space requirements of the circuit, the operating environment within which it must work, and the sensitivity and efficiency with which the circuit functions to accomplish a desired type of operation.

Accordingly, it is an object of the present invention to provide improved power control circuitry exhibiting the characteristics of low cost, small size, and high reliability.

From an operational standpoint, the merit of a power control circuit is a function of the manner in which it performs while accomplishing desired objectives. Since power control circuits may be used to control the duration of the power application to a load, the accuracy with which the power control circuit responds to input stimuli to effect the desired power control function is of extreme importance.

Thus, it is another object of the present invention to provide improved power control circuitry which accurately responds to input stimuli.

In addition to accuracy of response to input stimuli, the particular nature of the required stimulus is important. Thus, it is most desirable to effect control over a maximum amount of supplied energy with a minimum amount of power dissipation in the control circuitry. Power dissipation may be attributed to both the particular components employed and to the number of such components required.

Therefore, another object of the present invention is to provide circuitry that is operative in response to low power control signals to effect control over the supply of relatively large amounts of energy.

Still another object of the invention is to provide power control circuitry using a minimum number of components and wherein each of said components is characterized by relatively low power consumption.

The problem of reliability has been discussed hereinbefore and the objective of increasing the reliability of power control circuits is inherent in the present invention. Such reliability may be evidenced by optimum ability to withstand physical shock and varying environmental conditions, and relative immunity from electrical failure due to overload. Aside from the individual characteristics of each component in a circuit, it is well known that merely reducing the number of components reduces the probability of circuit failure.

Accordingly, from another aspect, the present invention has as an object the provision of improved power control circuits employing a minimum number of highly reliable components.

The relatively recent development of semiconductor devices has provided a new dimension in the area of electrical equipment reliability, size, and power consumption. In the power supply and control field, the silicon controlled rectifier has provided particular advantages. Silicon controlled rectifiers are basically three-terminal semiconductor rectifiers operative to switch from a high to a low impedance state between two main terminals in response to a relatively short impulse on a gate terminal. To control the supply of alternating current power two such devices, connected with opposing orientations, are generally interposed between the supply and a load. Control circuitry is used to selectively deliver independent triggering pulses to each device in accordance with a desired operating scheme. To reduce the cost and complexity of such arrangements, one of these controlled rectifiers may be eliminated by using a bridge circuit wherein four conventional rectifiers provide the bridge and a single controlled rectifier is connected across its output. Even though this technique reduces the required number of controlled rectifiers and perhaps the complexity of the triggering circuitry, it does so at the expense of added conventional rectifiers and added power loss in these rectifiers.

The invention of controlled bi-directional current conducting semiconductors has provided the answer to the need for simple control over the delivery of alternating current power. These semiconductors normally exhibit a high impedance characteristic between two main current carrying terminals. When a relatively low power triggering impulse is applied to a third or gate terminal, the device switches to a second state wherein a low impedance exists between the current carrying terminals. These semiconductors are bilateral in nature and permit current conduction in either direction with equal facility. Furthermore, the triggering impulses required to effect switching from a high to a low impedance state may generally be of either polarity. Obviously, the bilateral characteristic of the main current conducting path and the flexibility offered by the permissible forms of triggering impulses render the bi-directional current conducting semiconductors admirably suited for control of alternating current.

Another object of the present invention is to provide static switch circuits employing bi-directional current conducting semiconductors.

Still another object of the present invention is to provide static switch circuits which simply and effectively combine a minimum of conventional circuit elements with bi-directional current conducting semiconductors in order to produce unique power control systems exhibiting heretofore unattainable characteristics.

Generally speaking and in accordance with the invention, there are provided in combination, a bi-directional current conducting semiconductor device which normally exhibits a high impedance characteristic between two main current carrying terminals thereof and which normally exhibits a low impedance characteristic in response to the application of a control signal which has at least a predetermined amplitude to a third and gating terminal thereof, means for serially connecting the main terminals of the semiconductor device in a current carrying path to an alternating current source, a control signal source and selectively operable or switching means inserting the latter control signal source into circuit with the third terminal to effect the substantially full application of the output of the alternating current source to the load.

The invention is set forth with particularity in the appended claims. The organization and method of operation of the invention together with further objects and features thereof, may best be understood by reference to the following description taken in conjunction with the accompanying drawings wherein:

A general understanding of bi-directional current conducting semiconductors is required in order to understand and appreciate the invention as embodied in the illustrative circuits described hereinafter. Broadly speaking, these three terminal devices can be constructed to furnish four modes of operation. The modes of operation differ in the direction of current flow between the main current conduction carrying terminals of the device and in the direction of current flow into the trigger terminal of the device in order to initiate its switching. If the device is arbitrarily designated as having main current carrying terminals 1 and 2 and a gate terminal 3, the following table may be developed to represent the four modes of operation:

| Mode | $V_2$ | $I_3$ (for turn on) | |
|---|---|---|---|
| 1 | + | + | $V_2$ is positive if terminal 2 is more positive than terminal 1. $I_3$ is positive if current flows into gate terminal 3. |
| 2 | − | − | |
| 3 | + | − | |
| 4 | − | + | |

An examination of the above table makes it apparent that the devices may be switched to their low impedance state in either direction of conduction by triggering impulses of either polarity. The devices may be selectively constructed in order to furnish operation in any modes that are desired. Thus, for example, if it is wished to provide a device operative in the second and third mode, current conduction in either direction through the device may be triggered by impulses having a negative polarity only. On the other hand, if it is desired to operate only in the first and second mode, triggering impulses having a polarity unique to a single direction of conduction may be required.

Figure 1A:
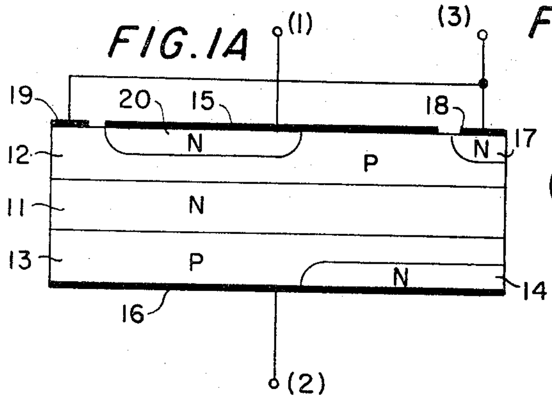
FIGS. 1A, 1B and 1C illustrate respectively: a diagrammatic representation of one form of controlled bi-directional current conducting semiconductor, a symbolic representation for such a device, and typical characteristic operating curves of such a device.

An example of the structure of a typical bi-directional current carrying semiconductor is shown in FIG. 1A. This particular structure has been shown and described in detail in the co-pending patent application of F. W. Gutzwiller, Ser. No. 331,776, filed Dec. 19, 1963 and assigned to the General Electric Company, assignee of the present invention. Although this particular device is primarily designed to function in the mode 1 and 2 set forth in the above table, operation in modes 3 and 4 is also possible. Accordingly, when current carrying terminal 2 is positive with respect to current carrying terminal 1, the device is switchable to a low impedance state by the application of a current into gate terminal 3. When the reverse polarity is applied between the main terminals 1 and 2 the device is switchable to a low impedance state by extracting gate current from gate terminal 3. Stated another way, conduction from terminal 2 to terminal 1 may be initiated by the application of a positive gating pulse to terminal 3 and conduction from terminal 1 to terminal 2 may be initiated by the application of a negative triggering pulse to terminal 3. Such a unitary structure may be described as a monolithic PNPN junction type semiconductor switching device and is described in greater detail in the aforementioned Ser. No. 331,776 of F. W. Gutzwiller. This bilateral controllable semiconductor switching device comprises a body of semiconductor material including five layers of one and the opposite conductivity types, layers of one conductivity type being interleaved with layers of the opposite conductivity type forming a plurality of P–N junctions therein. A first main current carrying electrode is provided in low resistance ohmic contact with a surface of an external layer of said body and an exposed surface of an adjacent intermediate layer. A second main current carrying electrode is provided in low resistance ohmic contact with a surface of the other external layer of said body and an exposed surface of an adjacent intermediate layer. A gate region is provided of the same conductivity type as said external layers of said body adjacent said intermediate layers contacted by the said first main current carrying electrode. The gating electrode is provided in ohmic contact with said gate region and with the adjacent intermediate layer to provide for switching the semiconductor device between high and low impedance states for current through said device in opposite senses.

Considering the device of 1A more specifically, it may be considered to be a five layer device having an internal layer 11 of n conductivity type sandwiched by p conductivity type region 12 and 13. The two p type layers 12 and 13 perform different functions for conduction in opposite directions through the device. For example, when the upper terminal 1 is positive relative to lower terminal 2, p type layer 12 operates as an emitter and the p-n junction between layers 12 and 11 is considered an emitter junction. Under these conditions, the p type layer 13 constitutes a base region which is separated by the n-p junction between layers 11 and 13. When the polarity between the main terminals 1 and 2 is reversed, p type layer 13 constitutes an emitter and p type layer 12 constitutes an internal base layer. Such a unitary structure may be described as monolithic.

An n conductivity region 14 is formed adjacent or contiguous with the portion of the p conductivity region 13. When terminal 1 is positive relative to terminal 2, n type region 14 constitutes an emitter region and the n-p junction between it and p type region 13 constitutes an emitter junction. In order to provide a corresponding emitter and emitter junction for conduction in the opposite sense, when terminal 2 is positive, an n conductivity type region 20 is formed adjacent or contiguous with a part of p layer 12 providing a p-n emitter junction for conduction of this polarity. The n type region 20 is only contiguous with a part of the p type region 12 and is spaced from the sides of the device to leave exposed surfaces of the p region 12 on both sides.

Electrical contacts for the main current conduction path through the device are provided by low resistance ohmic contacts 15 and 16 on the major faces of the device. Electrode or contact 15 contacts the external n type region 20 and the exposed portion of the next adjacent p type layer 12 thereby shorting the p-n junction therebetween. Electrode 16 extends over the external n layer 14 and the exposed portion of the p type layer 13 and thereby shorts the p-n junction therebetween. As shown in the figure, electrodes 15 and 16 are utilized to obtain terminals 1 and 2 of the device respectively.

It may be helpful to note that the device as thus far described constitutes a five layer semiconductor with shorted emitters and is essentially the five layer, 2-terminal bilateral switch described in the co-pending patent application of Holonyak et al., Ser. No. 838,504 filed Sept. 8, 1959, and assigned to the General Electric Company, assignee of the present invention.

In order to establish control over the conduction between terminals 1 and 2 of the device in FIG. 1A, two gate connections are provided. First, an n conductivity type region 17 is established to the portion of p type layer 12 near the main electrode 15. A low resistance ohmic contact or electrode 18 is formed on this gate region and gate terminal 3 is connected thereto. Another ohmic contact is established with p type layer 12 on the opposite side of the device adjacent the external n type layer 20. This second ohmic contact exemplified by electrode 19 is also connected to terminal 3. The object in making the two connections remote is to provide a relatively high resistance between them and thus reduce any electrical shorting. Since the distance from gate electrode 19 through p type region 12 under the external n type region 20 to the portion of main electrode 15 on region 12 is sufficient to provide a high resistance path, the two electrodes 18 and 19 are electrically remote.

A general understanding of the operation of the semiconductor device shown in FIG. 1A will be avaliable if one considers the device as being made up of two portions: the first portion comprising, electrodes 15 and 19, n type layer 20, p type layer 12, n type layer 11, p type layer 13, and electrode 16; and the second comprising, electrodes 15 and 18, n type layer 17, p type layer 12, n type layer 11, p type layer 13, n type layer 14, and electrode 16. Continuing with this concept, it will be appreciated that the first portion represents a standard type silicon controlled rectifier and its functioning may be considered analogous to such a device. The second portion may be considered to represent a remote gate silicon controlled rectifier and its functioning is analogous to such a device. The operation and functioning of silicon controlled rectifiers is fully set out in numerous publications including the General Electric Controlled Rectifier Manual, Second Edition, Copyright 1961 by the General Electric Company. The operation and functioning of the remote gate silicon controlled rectifier is fully described and illustrated in the co-pending patent application of F. E. Gentry et al., Ser. No. 326,162 filed Nov. 26, 1963 and assigned to the General Electric Company, assignee of the present invention. A still more complete consideration of the device is available in the aforecited patent application of F. W. Gutzwiller.

Figure 1B:
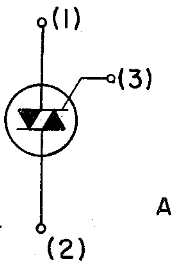
Figure 1C:
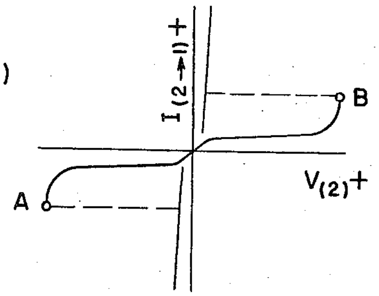

The operation of the device may briefly be considered in conjunction with the typical characteristic curves shown in FIG. 1C. These curves illustrate the current flow through terminals 1 and 2 as ordinates and voltage on the main terminals as abscissas.

When terminal 2 is positive relative to terminal 1 the two outer layers of the device in FIG. 1A tend to conduct because the p-n junctions between layers 13 and 11 and 12 and 20 respectively are forward biased. On the other hand, the center n-p junction between layers 11 and 12 tends to block current flow through the device. This blocking condition may be removed by either raising the total voltage across the junction to a sufficiently high value to force conduction thereacross, or by introducing a sufficient amount of current through the gate terminal 3 and electrode 19 to cause a change in the charge condition across the junction. In operation, this is effectively what is done. Without going into a detailed recitation of the movement of charges within the device, it suffices to say that when sufficient gate current is supplied thereto the space charge at the blocking n-p junction between layers 11 and 12 collapses and within a short while, the device presents a low impedance path for current flow from terminal 2 to terminal 1.

This condition is illustrated in the first quadrant of the characteristic shown in FIG. 1C. Thus, when the voltage on terminal 2 is positive (i.e. when the voltage on terminal 1 is negative) an increase in the voltage does not tend to increase current until a "breakover" point is attained at which avalanche multiplication begins. Beyond this point the current increases rapidly until the center junction between layers 11 and 12 becomes forward biased and at that time the semiconductor goes into a high conduction region. For increasing magnitudes of gate current into terminal 3, the magnitude of the breakover voltage is reduced.

When the voltage on terminal 1 is positive with respect to the voltage on terminal 2 the device in FIG. 1A operates in a somewhat different fashion but is again responsive to a gating impulse on terminal 3 to assume a high conduction state and in fact provides a mirror image of the type of operation previously described.

The application of a positive potential on terminal 1 with respect to terminal 2 tends to make the p-n junctions between layers 12 and 11 and 13 and 14 conductive. At the same time, the n-p junction between layers 11 and 13 tends to block current flow through the device. Once again, it will be appreciated that in order to overcome this blocking condition it is necessary to either raise the voltage across the junction to a high enough value to force conduction thereacross or to extract current from gate terminal 3 in order to change the charge condition appearing across this junction.

The third quadrant of the characteristic curve shown in FIG. 1C illustrates device operation under the last mentioned condition. Once again it will be seen that increasing the voltage between terminals 1 and 2 has little effect until a breakover point occurs at which time the current begins to increase, charges are redistributed within the various layers of the device, and finally the avalanche condition occurs wherein a high current is conducted between terminals 1 and 2. In effect, therefore, the device will be seen to exhibit bi-directional current conducting characteristics and is operative under the control of appropriate polarity triggering impulses on terminal 3 to selectively furnish a low impedance path between terminals 1 and 2.

Figure 2:
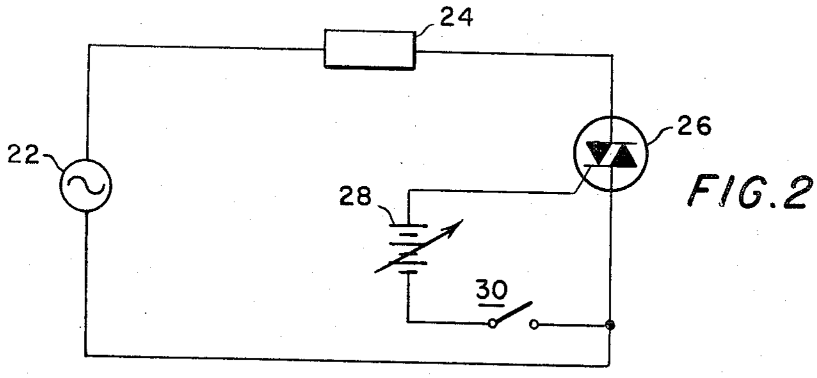
FIG. 2 is a circuit schematic of an embodiment of a static switch circuit constructed in accordance with the principles of the invention.

Referring now to FIG. 2, it is seen that the circuit load 24 serially connects the main current carrying terminal paths of the bi-directional semiconductor device 26 to an AC power source 22. A variable unidirectional supply source 28 depicted as a battery may selectively be placed in circuit with the gating terminal of semiconductor device 26 by means of a contact 30 depicted as a mechanical switch. In a completely static switch circuit, contact 30 may be a contact associated with an electromechanical relay external to the circuit or circuit means which is capable of assuming a conductive or non-conductive state in response to a given input thereto, the latter for example, being a switching circuit, active device and the like.

When the output of unidirectional potential source 28 is switched into circuit with one gating terminal of semiconductor device 26, the latter is switched to its low impedance state by a signal of a sufficient amplitude from source 28, i.e., rendered conductive, and the output of AC supply source 22 is substantially fully applied to load 24. The circuit of FIG. 1 illustrates that since semiconductor device 26 may be gated into conductivity in modes 1 and 4, or 2 and 3 (by either polarity of gate current for either polarity of applied supply voltage), there is made possible the use of a gating unidirectional control signal of either polarity for actuating such circuit. The magnitude of the unidirectional control signal has to be of a sufficient amplitude to produce gating of semiconductor device 26 with both polarity half cycles of output of the AC supply source 22 in order to ensure symmetry of load current. Thus, in the event that semiconductor device 26 is so designed as to require a lesser amplitude gating signal with one polarity of AC supply as compared to the amplitude of the gating signal with the other polarity of AC supply, then the magnitude of the control signal should at least have the latter magnitude. Semiconductor device 26 is gated into its conducting state at the time that the signal from unidirectional potential source is applied to its gating terminal and reverts to its blocking state after this control signal is removed and the current from source 22 attains the zero crossover point.

Figure 3:
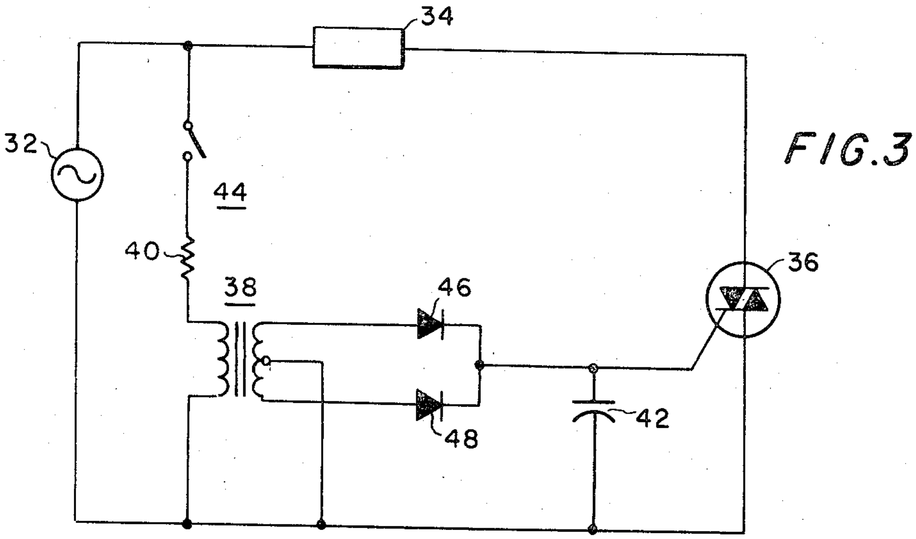
FIG. 3 is a schematic depiction of a circuit similar to that of FIG. 2.

FIG. 3 shows a circuit which is a variation of the static switch circuit depicted in FIG. 1 and includes means for providing a unidirectional signal to the gating terminal of semiconductor device 36 from source 32. Such signal is provided by rectifying a portion of the voltage from source 32 voltage provided in a transformer 38 which may be selectively switched across source 32 by a switching element 44 which may be static and full wave rectified by diodes 46 and 48 to produce the unidirectional control signal. Limitation of the current for the gating terminal of semiconductor device 36 may be effected by the use of a resistor 40 in the primary winding circuit of transformer 38 or it may alternatively be incorporated into its secondary winding circuit. The use of a unidirectional control signal in the circuit of FIG. 3 provides smooth alternation of conduction from one polarity to the other in semiconductor device 36 without the generation of higher order harmonics in the output waveform across load 34. The capacitor 42 connected between the output of the full wave rectifier and terminal 33 of source 32 functions as a filter to eliminate the requirement for compensating for phase displacement between current through the load and the supply voltage applied to transformer 38. In FIG. 3, the portion of the AC source voltage utilized to produce the gating signal is shown as being full wave rectified. However, it is readily appreciated that with sufficient filtering, only half wave rectification may be necessary.

Figure 4:
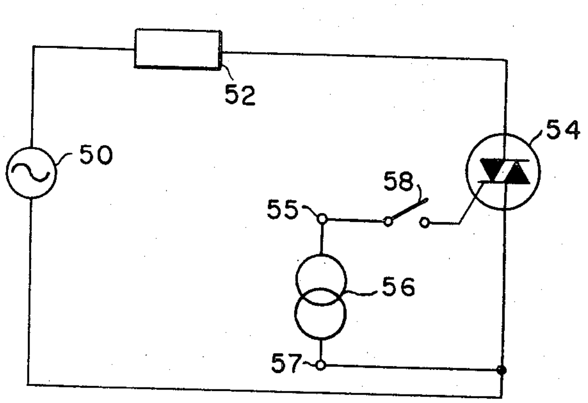
FIG. 4 is a schematic diagram of another embodiment of a static switch circuit in accordance with the invention.

In the circuit of FIG. 4, it is seen that the control signal which is selectively applied to the gating terminal of bilateral semiconductor device 54 is provided from an AC control signal source 56. Such AC control signal may be utilized in gating semiconductor device into conductivity because of the gate symmetry characteristics of semiconductor device 54. Thus, semiconductor device 54 will be rendered conductive if the voltage at terminal 55 of AC source 56 is positive and the gating signal is either positive or negative and will also be rendered conductive if the voltage at switching element 58 is positive and the gating signal is either positive or negative, the only requirement being that the gating signals be of sufficient magnitude for each combination of triggering conditions. In this latter connection, the performance of the circuit of FIG. 4 is dependent upon the phase and frequency of the control signal and upon the waveshape utilized therefor. If load 52 is resistive and the control signal from source 56 and the supply voltage from source 50 are of the same frequency, preferably the control signals should be 30° to 150° displaced in phase with respect to the phase of the supply voltage in order to maintain characteristics similar to those produced in the load waveform when the control signal is a unidirectional signal. If load 52 is reactive, it is preferred that the AC control signal be in phase with the output of the AC source 50 to ensure that the control signal is present at the gating terminal of semiconductor device 54 at the time that the load current passes through zero. Switching element 58, of course, functions to enable the selective application of control signals to the gating terminal of semiconductor device 54.

Figure 5:
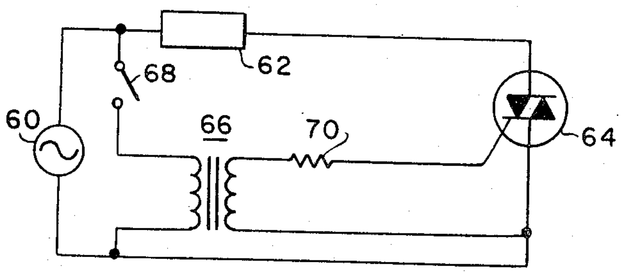
FIG. 5 is a schematic drawing of a circuit similar to that of FIG. 4.

The circuit of FIG. 5 is similar to that of FIG. 4 and illustrates how the AC control signal for semiconductor device 64 may be obtained by a step down transformer 66 which may be selectively inserted across the AC source 60 through contact 68. Resistor 70 may, of course, be included as a gate current limiting resistor. When contact 68 is closed, semiconductor device 64 is gated into its conductive state and the output of source 60 is substantially fully applied to load 62.

Figure 6:
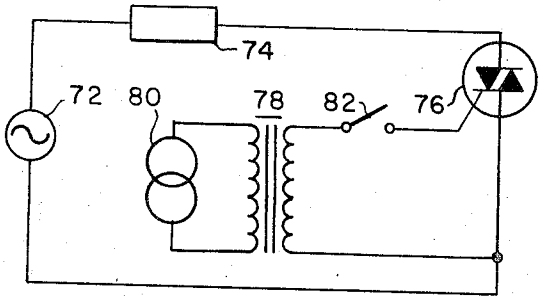
FIG. 6 is a schematic depiction of another circuit similar to that of FIGS. 4 and 5.

The circuit of FIG. 6 is a special case of the circuit of FIG. 4 in that the frequency of the output of the AC control signal source 80 is chosen to be higher than that of the frequency of AC supply source 72. In this situation, the isolating transformer 78 may be chosen to be a relatively small device. In the operation of the circuit of FIG. 6, the time at which conduction is initiated in semiconductor device 76 in either half cycle is determined by the phase relationship between the control signal and the supply voltage. If these two voltages are not synchronously related, it is readily appreciated that the delay angle therebetween will vary at a beat frequency rate. Thus, for example, if the frequency of the output of signal source 80 is chosen to be approximately 10 times the frequency of the output of supply source 72, the variations of the initial gating angle will be essentially insignificant. Frequency selectivity of the gating signal may be obtained by tuning the transformer 78 to a particular resonant frequency.

Figure 7:
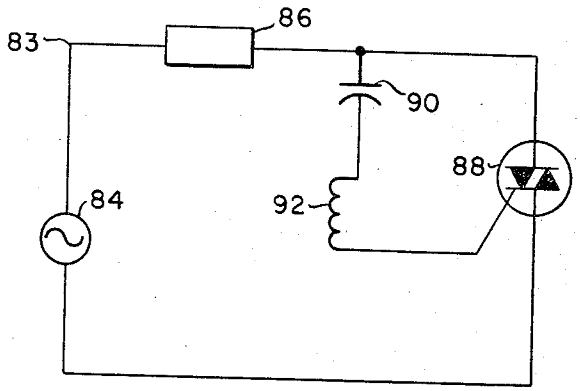
FIG. 7 is a circuit schematic of another embodiment of a static switch circuit constructed in accordance with the principles of the invention.

In the circuit of FIG. 7, the gating terminal of semiconductor device 88 is connected by load 86 to terminal 83 of A.C. supply source 84 through the series resonant circuit comprising a capacitor 90 and an inductor 92. This circuit is useful where switching or selective control of load is desired by means of suitable carrier current from a remote location. In such situation, when a carrier current having the frequency to which capacitor 90 and inductor 92 are tuned appears, then the series combination of capacitor 90 and inductor 92 present a low impedance path to such current and semiconductor device can be gated to its conductive state.

While there have been described what are considered to be the preferred embodiments of this invention, it will be obvious to those skilled in the art that various changes and modifications may be made therein and it is, therefore, aimed in the appended claims to cover all such changes and modifications as fall within the spirit and scope of the invention.

What is claimed as new and desired to be secured by Letters Patent of the United States is:

1. In combination, a bi-directional current conducting semiconductor device, said device comprising a body of semiconductor material including five layers of one and the opposite conductivity types, layers of one conductivity type being interleaved with layers of the opposite conductivity type forming a plurality of P-N junctions therein, a first main current carrying electrode in low resistance ohmic contact with a surface of an external layer of said body and an exposed surface of an adjacent intermediate layer, a second main current carrying electrode in low resistance ohmic contact with a surface of the other external layer of said body and an exposed surface of the adjacent intermediate layer, a gate region of the same conductivity type as said external layers of said body, adjacent said intermediate layers contacted by the said first main carrying electrode and third electrode means in ohmic contact with said gate region and with the adjacent intermediate layer and normally exhibiting a high impedance characteristic between said two main current carrying electrodes thereof and exhibiting a low impedance characteristic in response to the application of a control signal having at least a predetermined amplitude to said third electrode means, means for serially connecting said two main current carrying electrodes in a current carrying path to an alternating current source, a control signal source, and a switching element for selectively inserting last named source into circuit between said third electrode and one of said two main current carrying electrodes to control the switching of the output of said alternating source to said load in both directions.

2. The combination set forth in claim 1 wherein said control signal source is a unidirectional control signal source.

3. The combination set forth in claim 1 wherein said control signal source includes a rectifying means and means for selectively inserting said rectifying means in circuit with a portion of said A.C. source to produce a unidirectional signal.

4. The combination set forth in claim 1 wherein said control signal source includes a periodically variable control signal source and a switching element for selectively inserting said control signal source in the circuit between said third electrode and one of said main current carrying electrodes.

5. The combination set forth in claim 1 wherein the frequency of the output of said periodically variable control signal source is greater than the frequency of the output of the supply source.

6. The combination set forth in claim 1 wherein said control signal source includes a resonant circuit tuned to a chosen frequency coupled between the load and said third electrode, the presence of carrier current from the output of said alternating current source having said chosen frequency controlling the application of said control signals to said third electrode and consequently the switching of the output of said alternating current source to said load in both directions.

7. In combination, a bilateral controllable semiconductor switching device for controlling the current applied to a load from a source of alternating potential under control of switching signals comprising a body of semiconductor material including five layers of one and the opposite conductivity types, layers of one conductivity type being interleaved with layers of the opposite conductivity type forming a plurality of P-N junctions therein, a first main current carrying electrode in low resistance ohmic contact with a surface of an external layer of said body and an exposed surface of an adjacent intermediate layer, a second main current carrying electrode in low resistance ohmic contact with a surface of the other external layer of said body and an exposed surface of an adjacent intermediate layer, means for coupling said device in series between said first and said second main current carrying electrodes with said load and said alternating potential, a gate region of the same conductivity type as said external layers of said body adjacent said intermediate layer contacted by said first main current carrying electrode, gating electrode means in ohmic contact with said gate region and with the adjacent intermediate layer, means for switching said semiconductor device between high and low impedance states for current through said device in opposite senses comprising means for coupling such switching signals between said gate electrode means and one of said first and second main current carrying electrodes.

8. A switching circuit for controlling the current applied to a load from a source of alternating potential during both directions of current flow comprising a three terminal, monolithic, PNPN junction type semiconductor current switching device, said device normally exhibiting a high impedance state in both directions between a first and second one of said terminals but being capable of being selectively switched to a low impedance state in both directions between said terminals, a load, a source of alternating potential, means for coupling said device by said first and second terminals in series with said load and said source of alternating potential, a source of switching signal coupled between a third one of said terminals and said first terminal, said device responsive to at least a predetermined amplitude of said switching signal and a predetermined amplitude of one polarity of the alternating potential developed at first and second terminals to switch to its low impedance state and control current flow in one direction to said load, said device responsive to current flow therethrough falling below a predetermined amplitude to switch to said high impedance state, said device responsive to at least a predetermined amplitude of said switching signal and a predetermined amplitude and the other polarity of the alternating potential developed at said first and second terminals to switch to its low impedance state and control current flow in the other direction to said load. Said device comprising a body of semiconductor material including five layers of one and the opposite conductivity types, layers of one conductivity type being interleaved with layers of the opposite conductivity type forming a plurality of P–N junctions therein, a first main current carrying electrode in low resistance ohmic contact with a surface of an external layer of said body and an exposed surface of an adjacent intermediate layer, a second main current carrying electrode in low resistance ohmic contact with a surface of the other external layer of said body and an exposed surface of the adjacent intermediate layer, a gate region of the same conductivity as said external layers of said body adjacent said intermediate layer contacted by said first main current carrying electrode, and third electrode means in ohmic contact with said gate region and with the adjacent intermediate layer.

9. An arrangement according to claim 8 wherein said source of a switching signal comprises a source of recurrent switching pulses having said predetermined amplitude and timed to occur during said one and other polarity intervals of said developed alternating potential.

10. An arrangement according to claim 9 wherein said source of switching pulses comprises means for full wave rectifying the alternating potential from said source of alternating potential to produce said switching pulses.

11. An arrangement according to claim 9 wherein said switching pulses are unidirectional.

12. An arrangement according to claim 8 wherein said source of a switching signal comprises a source of alternating signals having a predetermined frequency.

13. An arrangement according to claim 12 wherein said frequency is different from the frequency of said alternating potential.

14. An arrangement for controlling the alternating current applied to a load from a source of pulsating potential during both directions of current flow comprising a three terminal junction type semiconductor switching device, said device comprising a body of semiconductor material including five layers of one and the opposite conductivity types, layers of one conductivity type being interleaved with layers of the opposite conductivity type forming a plurality of P–N junctions therein, a first main current carrying electrode in low resistance ohmic contact with a surface of an external layer of said body and an exposed surface of an adjacent intermediate layer, a second main current carrying electrode in low resistance ohmic contact with a surface of the other external layer of said body and an exposed surface of an adjacent intermediate layer, a gate region of the same conductivity type as said external layers of said body adjacent said intermediate layer contacted by said first main current carrying electrode, and third electrode means in ohmic contact with said gate region and with the adjacent intermediate layer, said device normally exhibiting a high impedance state in both directions between said first and second main current carrying electrodes but being capable of being switched to a low impedance state in both directions between said first and second main current carrying electrodes, means for coupling said load to said first and second main current carrying electrodes, means for coupling said source of pulsating potential to said first and second main current carrying electrodes, a source of a switching signal, means timed with the polarity of said pulsating potential for switching said device to said low impedance state in each direction comprising means for applying a respective signal for each such direction from said source of a switching signal between one of said main current carrying electrodes and said third electrode, said device responsive whenever current flow through said device between said first and second main current carrying electrodes falls below a given amplitude of a high impedance state.

15. An arrangement for controlling the switching of current from a source of alternating potential to a load during both directions of current flow comprising a three terminal, PNPN junction type semiconductor current switching device, said device comprising a body of semiconductor material including five layers of one and the opposite conductivity types, layers of one conductivity type being interleaved with layers of the opposite conductivity type forming a plurality of P–N junctions therein, a first main current carrying electrode in low resistance ohmic contact with a surface of an external layer of said body and an exposed surface of an adjacent intermediate layer, a second main current carrying electrode in low resistance ohmic contact with a surface of the other external layer of said body and an exposed surface of the adjacent intermediate layer, a gate region of the same conductivity as said external layers of said body adjacent said intermediate layer contacted by said first main current carrying electrode, and third electrode means in ohmic contact with said gate region and with the adjacent intermediate layer, said device normally exhibiting a high impedance state between said first and second main current carrying electrodes but being capable of being switched to a low impedance state between said electrodes, means for coupling said load and said source of alternating potential to said first and second main current carrying electrodes, means to switch said device to its low impedance state from one direction of current flow comprising a source of a switching signal of predetermined amplitude coupled between said third electrode and said first main current carrying electrode, means to switch said device to said high impedance state comprising said device responsive to current flow therethrough falling below a given amplitude during change of direction of current flow to switch to said high impedance state, and means to switch said device to its low impedance state during said other direction of alternation of said alternating potential comprising said source of a switching signal coupled between said first and third electrodes.

References Cited

UNITED STATES PATENTS

| | | | |
|---|---|---|---|
| 1,635,779 | 7/1927 | Carter | 340—171 |
| 2,220,118 | 11/1940 | Overbeck | 315—275 |
| 2,774,888 | 12/1956 | Trousdale | 307—88.5 |
| 3,196,330 | 7/1965 | Moyson | 317—235 |
| 3,221,183 | 11/1965 | White | 307—88.5 |

FOREIGN PATENTS

| | | |
|---|---|---|
| 1,267,417 | 6/1960 | France. |

OTHER REFERENCES

Solid State Products Inc. Bulletin D420–02, August 1959 Application and Circuit Design Notes p. 27, FIG. 43.

ARTHUR GAUSS, *Primary Examiner.*

B. P. DAVIS, *Assistant Examiner.*